April 10, 1962 G. OUVRIER 3,029,319

TONE ARM AND MAGNETIC TRANSDUCER HEAD THEREFOR

Filed Dec. 1, 1958 2 Sheets-Sheet 1

INVENTOR:
GERHARD OUVRIER
By Kurt Kelman
his AGENT

INVENTOR:
GERHARD OUVRIER
By Kurt Kelman
his AGENT

United States Patent Office 3,029,319

Patented Apr. 10, 1962

3,029,319

TONE ARM AND MAGNETIC TRANSDUCER HEAD THEREFOR

Gerhard Ouvrier, Bad Homburg, Germany, assignor to Wolfgang Assmann Gesellschaft mit beschränkter Haftung, Bad Homburg, Germany Filed Dec. 1, 1958, Ser. No. 777,238
Claims priority, application Germany Dec. 4, 1957
21 Claims. (Cl. 179—100.2)

The present invention relates to magnetic sound recording and reproducing devices of the type in which intelligence is recorded on the magnetizable sound track at the bottom of a sound groove in discoid or tape-like record media, and more particularly to improvements in the construction and mounting of transducer heads in such devices.

An important object of the invention is to provide a magnetic sound recording and reproducing device in which the bearing surface of pole pieces remains in continuous and intimate contact with the sound track in all positions of the transducer head.

Another object of the invention is to provide an improved connection between a transducer head and the tone arm in magnetic sound recording and reproducing devices, e.g. in dictaphones, which can be utilized with different types of magnetic record media.

A further object of the invention is to provide a transducer head in which the pole pieces are positively prevented from jumping the sound track in the groove of a magnetic record medium.

An additional object of the instant invention is to provide a magnetic transducer head which is so constructed and mounted that the bearing surface of its pole pieces remains in continuous and full contact with the sound track of a magnetic record medium even if the latter should move in an arcuate path.

A concomitant object of the invention is to provide a magnetic transducer head which is capable of recording intelligence without undesirable variations in the volume of sound.

A still further object of the invention is to provide a magnetic transducer head whose pole pieces remain in full and continuous contact with the sound track of a record medium even after prolonged and extensive use, and despite progressively increasing wear of the pole pieces.

The above and certain other objects of the invention are attained by the provision of a transducer head which is so connected to the tone arm that it can pivot about an axis transverse to the lands and sound grooves in the magnetic record medium, and by the provision of at least one guide or runner which slides or floats over the recording surface of the medium and is rigidly connected to the head in such manner that it prevents movements of pole pieces and of their bearing surface away from full and intimate contact with the sound track. In its preferred form, the novel head is mounted in a two-armed bracket which is fixed to an end of the tone arm and supports an axle pivotally mounting the head for rotation about an axis disposed between the pole pieces and the guide. The improved mounting of the head is comparable to the mounting of a two-armed lever whose one arm is rigidly connected to the guide and whose other arm carries the pole pieces. The pole pieces are preferably closer to the pivot axle then the guide and the center of gravity of the transducer head is preferably vertically aligned with the bearing surface of the pole pieces; therefore, the bearing surface is constantly urged into full contact with the sound track at the bottom of a selected sound groove in the recording surface of magnetic medium.

An additional important feature of my invention resides in the provision of a second guide which may assume the form of a stylus, a segment or a disc, and which is connected to the head by resilient means and extends into a sound groove preferably closely adjacent to the groove into which the bearing surface of pole pieces extends. The resilient mounting of second guide or runner is such that the latter can readily yield to forces acting in directions perpendicular to the recording surface of grooved medium but can resist all lateral forces to thus prevent the pole pieces from jumping the sound track in a selected sound groove and from eventually cutting the lands between the grooves.

Certain additional features of the invention reside in the selection of specific and very advantageous configuration for the guide means; in the provision of a specific resilient connection between the transducer head and the second guide; as well as in the selection of specific materials for the guides to insure that the latter will resist wear and will maintain the pole pieces in a sound track even if the pole pieces should become worn after extended sliding contact with the record medium.

The invention will be described in greater detail with reference to the accompanying drawing, in which.

Figure 1:
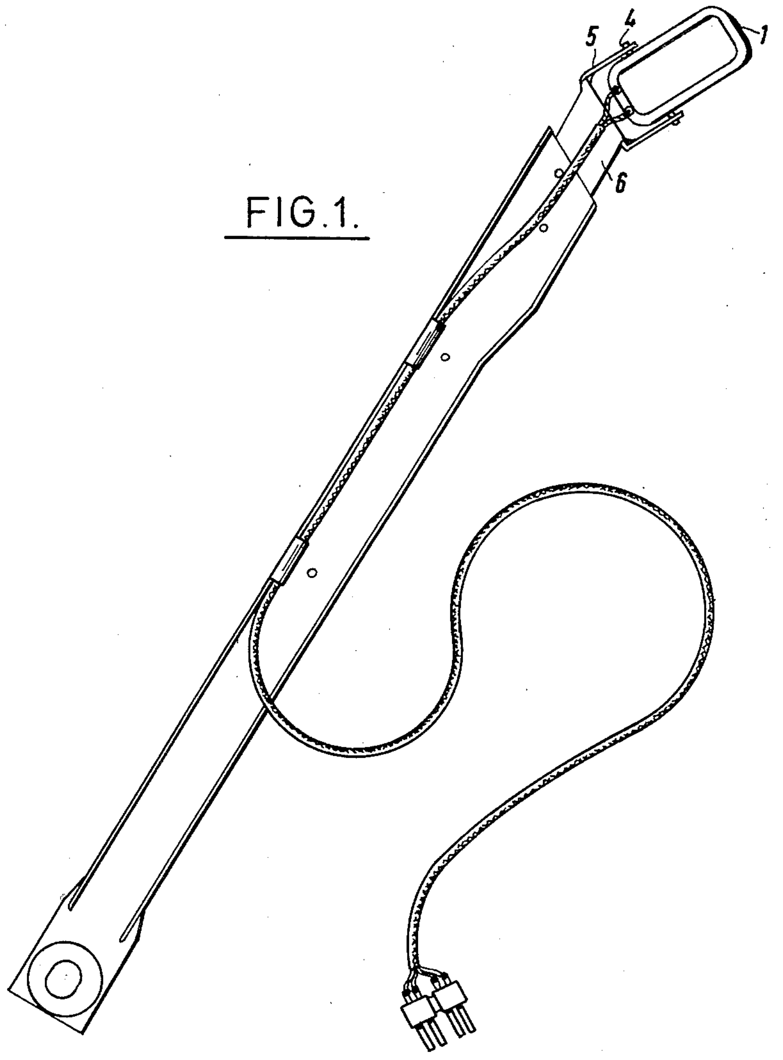
FIG. 1 is a plan view of the improved transducer head and of the tone arm therefor.
Figure 2:
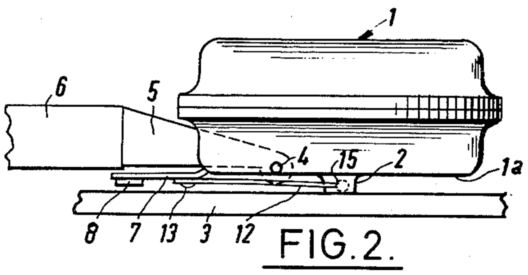
FIG. 2 is an enlarged side elevational view of the head in operative position on a magnetic record medium.
Figure 3:
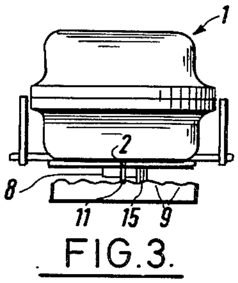
FIG. 3 is a front elevational view of the head as seen from the right-hand side of FIG. 2.
Figure 4:
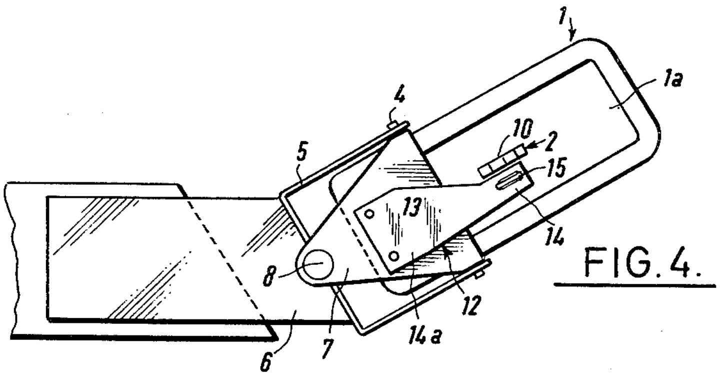
FIG. 4 is a bottom plan view of the transducer head.
Figure 5:
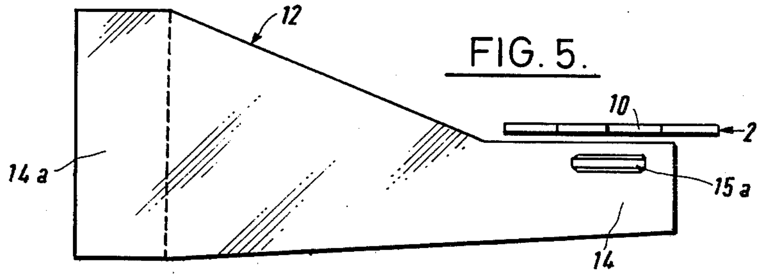
FIG. 5 is an enlarged detail view of a component part supporting a slightly modified guide.

Referring now in greater detail to the drawings, and first to FIGS. 1 and 2, the magnetic transducer head 1 carries pole pieces 2 of relatively soft magnetizable material which extend from its underside *1a* and may be placed to rest in a sound groove of the magnetic record medium 3. Transducer head 1 is connected to and is pivotable about a horizontal axle 4 whose terminals are mounted in the ends of two arms forming part of a bracket 5 which latter is fixed to the end of a tone arm 6. A holder 7 is rigidly connected to the underside of transducer head 1 and extends from the axle 4 toward the end of supporting or tone arm 6. To the underside of member 7 is connected a runner or guide 8 which is in contact with and slides or floats along at least one but preferably more lands 9 between the grooves formed in the recording upper surface of medium 3, as is best shown in FIG. 3. Runner or guide 8 is made of a material whose frictional wear resistance is greater than the frictional wear resistance of relatively soft magnetizable pole pieces 2 and, by being rigidly connected to transducer head 1, member 8 can perform neither horizontal nor vertical movements with respect thereto. It will be noted that the mounting of head 1 with its holder 7 is similar to that of a two-armed lever whose one arm between axle or shaft 4 and pole pieces 2 is shorter than the other arm between axle 4 and runner or guide 8. In this manner, all zones of the bearing surface 10 at the underside of assembly 2 which, as is best shown in FIGS. 4 and 5, is of substantially rectangular contour, are in continuous and intimate contact with the sound track 11 at the botom of a selected groove in medium 3 (see FIG. 3). Thus, the principle underlying my invention is that the pivotally mounted transducer head 1 is supported upon the record medium 3 at two spaced points, i.e. by the bearing surface 10 of pole pieces 2 and by the contact surface of guide 8.

Transducer head 1, and more particularly its holder 7, supports a resilient leaf or plate 12 which is connected, either by welding, soldering or spots of glue 13, to triangular member 7 in such manner that its free end zone 14 which mounts a second guide or runner 15 (see FIG. 4) readily yields to relatively weak forces acting upon member 15 in directions perpendicular to the grooved recording surface of medium 3, but will resist forces acting in a plane parallel with the underside 1a of the transducer head. The resiliency of plate 12 is improved by imparting thereto the shape simulating a triangle and by connecting the base 14a of triangular member 12 to holder 7, while the pointed end or reduced zone 14 of the triangle opposite base 14a carries the aforementioned guide or runner 15.

Member 15 is made of sapphire or other frictional wear resistant material and preferably is located very close to the bearing surface 10, e.g. in the thereto adjacent groove of record medium 3. This guide may also assume the shape of a stylus as contrasted with the discoid shape of member 15 shown in FIG. 2 or segmental shape of a member 15a shown in FIG. 5. The purpose of guide 15 or 15a is to take up lateral stresses, i.e. to prevent bearing surface 10 from jumping the sound track. The resistance of guide 15 to stresses in directions perpendicular to the recording surface of medium 3 is very small due to the resilient nature and mounting of plate 12. However, when subjected to lateral stresses, guide 15 bears against one of adjacent lands 9 in the recording surface of medium 3 and thus prevents lateral movements of pole pieces 2 from one onto another sound track 11. When in unstressed condition, plate 12 is substantially parallel with the underside 1a of transducer head 1.

Guide or runner 15 is preferably of such cross-sectional contour as to completely fill the groove between two adjacent lands or ridges 9, i.e. it should have no lateral play in its groove. Any forces acting in directions perpendicular to the underside of head 1 are taken up by guide 8 which slides along and, due to pivotal mounting of head 1 on its axle 4, constantly contacts the lands or ridges 9 forming part of medium 3. The horizontal forces, i.e. those acting in a plane parallel with the underside 1a of head 1 and with the recording surface of medium 3, are taken up by the other runner 15. Because it travels between a pair of adjacent lands 9, guide 15 positively prevents lateral movements of bearing surface 10 and assists in holding the latter in continuous and intimate magnetic contact with the sound track 11. As will be observed in FIGS. 2 and 3, the bearing surface 10 of pole pieces 2 is in line with the center of gravity of transducer head 1. It will also be noted that the width of substantially rectangular bearing surface 10 equals the width of each sound track 11.

Since the sole connection between the end of tone arm 6 and the transducer head 1 consists of aforementioned axle 4 about which the head is free to pivot, and since the center of gravity of head 1 is preferably vertically aligned with and above the bearing surface 10, the weight of arm 6 tends to urge the guide 8 into contact with lands 9 when the head is in operative position as shown in FIG. 2. The pressure between bearing surface 10 and sound track 11 is reduced by contact of guides 8 and 15 with the lands 9 and with the surfaces in a selected groove, respectively, though the primary purposes of guide 15 is to take up lateral but only very small vertical stresses. The contact of pole pieces 2 with a sound track 11 remains constant due to their alignment with the center of gravity of pivotable head 1 and to the guiding action of members 8 and 15.

The invention is, of course, not limited to the specific embodiments described and illustrated but may be realized in various modifications and adaptations without departing from the spirit and scope of the appended claims.

1. In a sound recording and reproducing device, in combination: a tone arm having an end; a magnetic transducer head having an underside; means connecting the head to the end of said arm for pivotal movements about a horizontal axis with respect thereto; pole pieces connected to and extending from the underside of said head; first guide means rigidly connected to and extending beyond the underside of said head at one side of said axis and at a point spaced from said pole pieces; and second guide means adjacent to said pole pieces, located at the other side of said axis, and connected to said head, the connection between said head and the second guide means being such that the second guide means is movable in directions toward and away from the underside of said head but is rigidly connected to the head against movements in a plane parallel with said underside.

2. The device as set forth in claim 1, wherein said connecting means comprises an axle connected to said head and bracket means connected with the end of said arm and including two arms the ends of which are connected with said axle.

3. The device as set forth in claim 1, wherein the material of said first guide means has a frictional wear resistance greater than the frictional wear resistance of said pole pieces.

4. The device as set forth in claim 1, wherein said pole pieces are aligned with the center of gravity of said head.

5. The device as set forth in claim 1, wherein said second guide means is of discoid shape.

6. The device as set forth in claim 1, wherein said second guide means is of segmental shape.

7. The device as set forth in claim 1, wherein the connection between said head and the second guide means comprises a resilient plate having one end rigidly connected with said head and another end mounting said second guide means.

8. The device as set forth in claim 7, wherein said resilient plate is of substantially triangular contour having a base connected to said head and a reduced zone opposite said base mounting the second guide means.

9. The device as set forth in claim 7, wherein said plate is substantially parallel with the underside of said head when in unstressed condition.

10. The device as set forth in claim 1, further comprising a holder rigidly connected to the underside of said head and extending toward the end of said arm, said first guide means being rigidly connected to said holder.

11. The device as set forth in claim 1, wherein the distance between said axis and said first guide means is greater than the distance between said axis and said second guide means.

12. In a sound recording and reproducing device, in combination: a magnetic record medium having a recording upper surface and a plurality of alternating lands and grooves in said surface, each groove having a bottom zone constituting the sound track; a tone arm having an end; a magnetic transducer head having an underside adjacent to said surface; means connecting said head to the end of said arm for pivotal movements about a horizontal axis transverse to said grooves and said lands; guide means rigidly connected to said head and located between said axis and the end of said arm, said guide means extending beyond the underside of said head into sliding contact with at least one of said lands; pole pieces connected to and extending beyond the underside of said head at a point distant from said guide means, the pole pieces having a bearing surface in full contact with the sound track in one of said grooves, and said axis being disposed between the pole pieces and said guide means; second guide means adjacent to said pole pieces and extending into one of said grooves; and resilient means connecting the second guide means to said head for movements toward and away from said underside and against movements with respect to the head in a plane parallel with said recording surface.

13. The device as set forth in claim 12, wherein said guide means has a surface turned toward said recording surface and of such magnitude as to simultaneously contact a plurality of said lands.

14. The device as set forth in claim 12, wherein the cross-sectional contour of said second guide means is such as to completely fill a zone of the groove into which the second guide means extends.

15. The device as set forth in claim 12, wherein said second guide means is a sapphire stylus.

16. The device as set forth in claim 12, wherein said second guide means extends into the groove immediately adjacent to the groove into which the bearing surface of said pole pieces extends.

17. In a sound recording and reproducing device, in combination, a recording disc having a face formed with a plurality of laterally juxtaposed elongated grooves, said grooves defining therebetween elongated lands on said face, the bottom portion of said disc in at least one of said grooves constituting a magnetizable sound track; tone arm means; pivot means on said arm means having an axis transverse of said one groove; a magnetic transducer head mounted on said pivot means for movement about said axis; pole piece means on said head and extending into a portion of said one groove longitudinally spaced from said axis; first guide means mounted on said head for contact with a portion of said face longitudinally spaced from said axis in a direction away from said pole piece means; and second guide means secured to said head against lateral movement relative to said pole piece means and in guiding engagement with another groove laterally juxtaposed to said one groove.

18. In a device as set forth in claim 17, said first guide means being in contact with at least one of said lands.

19. In a device as set forth in claim 17, said first guide means being in simultaneous contact with a plurality of said lands.

20. In a device as set forth in claim 17, said second guide means being secured to a portion of said head longitudinally spaced from said axis in a direction away from said pole piece means, and being in guiding engagement with a portion of said other groove laterally juxtaposed to said portion of said one groove.

21. In a device as set forth in claim 17, said second guide means being resiliently pivotable on said head in a plane substantially perpendicular to said face.

References Cited in the file of this patent

UNITED STATES PATENTS

| | | |
|---|---|---|
| 2,361,753 | Eilenberger | Oct. 31, 1944 |
| 2,567,092 | Williams | Sept. 4, 1951 |
| 2,867,694 | Person | Jan. 6, 1959 |
| 2,869,876 | Brasseur | Jan. 20, 1959 |

FOREIGN PATENTS

| | | |
|---|---|---|
| 991,835 | France | Oct. 10, 1951 |
| 72,995 | Netherlands | July 17, 1954 |